US 8,787,734 B2

(12) United States Patent
Minobe (10) Patent No.: US 8,787,734 B2
(45) Date of Patent: Jul. 22, 2014

(54) RECORDING APPARATUS FOR RECORDING PROGRAM CONTENT TRANSMITTED IN BROADCAST SIGNAL AND CONTROL METHOD THEREOF

(75) Inventor: Miyako Minobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 12/621,454

(22) Filed: Nov. 18, 2009

(65) Prior Publication Data
US 2010/0124402 A1 May 20, 2010

(30) Foreign Application Priority Data

Nov. 19, 2008 (JP) ................................. 2008-295798

(51) Int. Cl.
*H04N 5/76* (2006.01)
*H04N 9/80* (2006.01)

(52) U.S. Cl.
USPC ............ 386/295; 386/239; 386/294; 386/341

(58) Field of Classification Search
USPC ........................ 386/239–248, 291–299, 341
See application file for complete search history.

(56) References Cited

U.S. PATENT DOCUMENTS

| 2003/0123845 A1* | 7/2003 | Koda et al. ...................... 386/46 |
| 2005/0141873 A1* | 6/2005 | Shimaya ........................ 386/83 |
| 2007/0212018 A1* | 9/2007 | Kimura ........................... 386/83 |
| 2008/0152302 A1* | 6/2008 | Kido .............................. 386/70 |

FOREIGN PATENT DOCUMENTS

| JP | 10-222963 A | 8/1998 |
| JP | 2002-171485 A | 6/2002 |
| JP | 2005-259295 A | 9/2005 |
| WO | 2006/121049 A | 11/2006 |

\* cited by examiner

*Primary Examiner* — Hung Dang
(74) *Attorney, Agent, or Firm* — Canon USA, Inc., IP Division (57) ABSTRACT

A recording apparatus includes a storage unit configured to record program content data transmitted in a broadcast signal and store the transmitted program content data in a storage unit, a selection unit configured to select multi-view content data broadcast by a plurality of channels and including content data associated with each other from among the program content data stored in the storage unit, and a deletion unit configured to delete, from the storage unit, content data of at least one but not all of the plurality of channels included in the multi-view content data selected by the selection unit.

14 Claims, 10 Drawing Sheets

FIG.2

| PMT | PMT_PID | ES TYPE | ES_PID | TAG VALUE |
|---|---|---|---|---|
| 3ch | 0x1002 | Video2 | 0x162 | 0x01 |
| | | Audio2 | 0x231 | 0x11 |
| | | Audio3 | 0x232 | 0x13 |
| | | CAPTION2 | 0x511 | 0x31 |
| 4ch | 0x1003 | Video1 | 0x161 | 0x00 |
| | | Audio1 | 0x230 | 0x10 |
| | | Audio2 | 0x231 | 0x11 |
| | | CAPTION1 | 0x510 | 0x30 |
| | | OTHER DATA | 0x450 | 0x40 |
| 5ch | 0x1004 | Video3 | 0x163 | 0x02 |
| | | Audio3 | 0x232 | 0x13 |
| | | CAPTION1 | 0x510 | 0x30 |

| GROUP TYPE | GROUP ID | CHANNEL DESCRIPTION | ES TYPE | TAG VALUE |
|---|---|---|---|---|
| 000 | 0x0 | MAIN <FRONT ANGLE> | Video1 | 0x00 |
| | | | Audio1 | 0x10 |
| | | | Audio2 | 0x11 |
| | | | CAPTION1 | 0x30 |
| | | | OTHER DATA | 0x40 |
| | 0x1 | SUB1 <RIGHT ANGLE (R)> | Video2 | 0x01 |
| | | | Audio2 | 0x11 |
| | | | Audio3 | 0x13 |
| | | | CAPTION2 | 0x31 |
| | 0xF | SUB2 <LEFT ANGLE (L)> | Video3 | 0x02 |
| | | | Audio3 | 0x13 |
| | | | CAPTION1 | 0x30 |

FIG.5

| No. | PROGRAM NAME | |
|---|---|---|
| 1 | PROGRAM 1 | MULTI-VIEW |
| 2 | PROGRAM 2 | |
| 3 | PROGRAM 3 | |
| 4 | PROGRAM 4 | MULTI-VIEW |
| 5 | . . . | |

| No. | PROGRAM NAME | BROADCAST DATE | RECORDING TIME | MAIN ES_PID | SUB ES_PID |
|---|---|---|---|---|---|
| 1 | PROGRAM A | 2008/1/1 | 2 HOURS 30 MINUTES | 0x162, 0x231, 0x232, 0x511 | 0x161, 0x231, 0x233, 0x510 |
| 2 | PROGRAM B | 2008/3/10 | 1 HOUR 15 MINUTES | 0x171, 0x241, 0x243, 0x520 | 0x172, 0x242, 0x243, 0x521 |
| 3 | PROGRAM C | 2008/4/7 | 2 HOURS | ⋮ | ⋮ |
| 4 | PROGRAM D | 2008/5/25 | 1 HOUR | ⋮ | ⋮ |
| 5 | ⋮ | ⋮ | ⋮ | ⋮ | ⋮ |

| No. | REGISTRATION KEYWORD |
|---|---|
| 1 | ACTRESS NAME C |
| 2 | AMATEUR BASEBALL TEAM NAME G |
| 3 | PROGRAM NAME XYZ |
| 4 | . . . |
| 5 | . . . |
| 6 | . . . |
| 7 | . . . |
| 8 | . . . |

FIG.10

| GROUP TYPE | GROUP ID | CHANNEL DESCRIPTION | ES TYPE | TAG VALUE |
|---|---|---|---|---|
| 000 | 0x0 | MAIN CHANNEL | Video1 | 0x00 |
| | | | Audio1 | 0x10 |
| | | | Audio2 | 0x11 |
| | | | CAPTION1 | 0x30 |
| | | | OTHER DATA | 0x40 |
| | 0x1 | BASEBALL TEAM G BENCH | Video2 | 0x01 |
| | | | Audio2 | 0x11 |
| | | | Audio3 | 0x13 |
| | | | CAPTION2 | 0x31 |
| | 0xF | BASEBALL TEAM T BENCH | Video3 | 0x02 |
| | | | Audio3 | 0x13 |
| | | | CAPTION1 | 0x30 |

RECORDING APPARATUS FOR RECORDING PROGRAM CONTENT TRANSMITTED IN BROADCAST SIGNAL AND CONTROL METHOD THEREOF

BACKGROUND OF THE INVENTION

1. Field of the Invention

The present invention relates to a recording apparatus for recording program content transmitted in a broadcast signal and a control method thereof.

2. Description of the Related Art

In recent years, recording apparatuses that are capable of recording program content of digital broadcasting to a hard disk drive (HDD) or optical disk (e.g., digital versatile disc (DVD)) have become popular. Unlike apparatuses for conventional analog recording using magnetic tapes, the recording apparatuses for recording digital broadcasting are capable of recording additional information in addition to a video image or sound.

According to digital broadcasting in Japan, viewers can also enjoy multi-view broadcasting. According to the multi-view broadcasting, the viewers can freely select one out of three angles of a video image in the same program (service). Program content that includes a plurality of content data that are associated with one another and are broadcast by a plurality of channels in the same time period are hereinafter referred to as multi-view content. A recording apparatus capable of recording multi-view content is commercially available. By using this recording apparatus, three channels of content data having a standard definition (SD) image quality can be recorded at the same time. With the spread of digital broadcasting, the number of program content data of multi-view broadcasting is expected to increase.

Conventionally, a method for deleting the oldest content data or indicating already-reproduced data as target data that may be deleted if a hard disk in the recording apparatus runs out of space has been proposed.

Further, Japanese Patent Application Laid-Open No. 10-222963 discusses a method for setting an appropriate storage period for each category of the program and determining a recording area for the information whose storage period has expired as an area allowed to be deleted.

Further, Japanese Patent Application Laid-Open No. 2002-171485 discusses a method for securing a required free space by re-recording once-recorded program content in a lower bit rate.

The viewer can enjoy the multi-view content by simultaneously viewing video images of a plurality of channels that are displayed using multi-view display as well as freely selecting a video image of a channel that the user desires to view. If the multi-view content includes content data of a main channel and content data of a sub channel, depending on the program, the viewer can fully enjoy the program by viewing only the main channel.

SUMMARY OF THE INVENTION

The present invention is directed to a recording apparatus that is capable of increasing the free space of a storage unit by deleting content data of at least one channel that constitutes multi-view content, and is also directed to a control method for the recording apparatus.

According to an aspect of the present invention, a recording apparatus includes a storage unit configured to record and store program content data transmitted in a broadcast signal, a selection unit configured to select multi-view content data broadcast by a plurality of channels and including content data associated with each other from among the program content data stored in the storage unit, and a deletion unit configured to delete, from the storage unit, content data of at least one but not all of the plurality of channels included in the multi-view content data selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
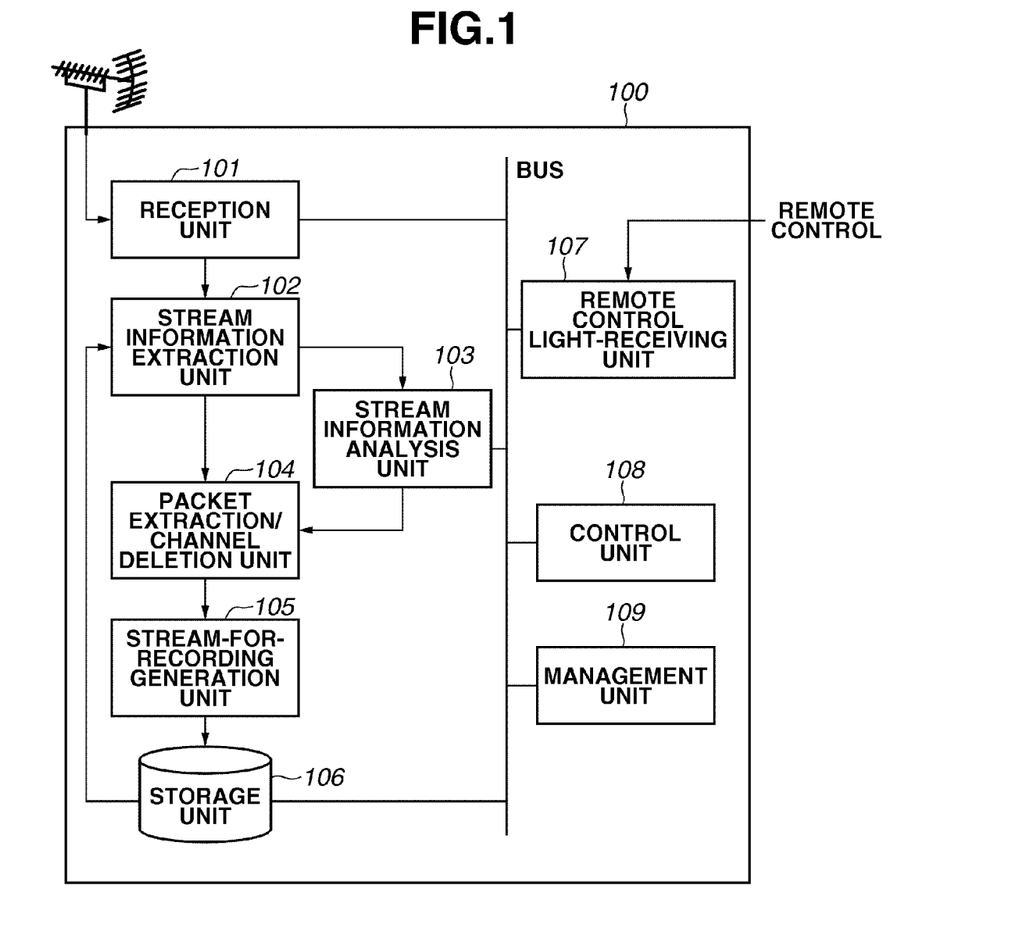
FIG. 1 is a block diagram illustrating a configuration of a recording apparatus according to a first exemplary embodiment of the present invention.

FIG. 1 is a block diagram illustrating a configuration of a recording apparatus 100 according to a first exemplary embodiment of the present invention. The recording apparatus 100 includes a reception unit 101, a stream information extraction unit 102, a stream information analysis unit 103, a packet extraction/channel deletion unit 104, a stream-for-recording generation unit 105, a storage unit 106, a remote control light-receiving unit 107, a control unit 108, and a management unit 109.

The remote control light-receiving unit 107 receives a signal transmitted from a remote control unit and accepts an instruction from the user. The control unit 108 controls each of the function blocks. If the user gives an instruction to record a broadcast program or to reserve recording of a broadcast program by operating the remote control unit, then the control unit 108 controls each function block so that the desired broadcast program is stored in the storage unit 106.

The reception unit 101 receives digital broadcasting signals of digital terrestrial broadcasting, digital broadcasting satellite (BS) broadcast, and digital communication satellite (CS) broadcast, and then selects a designated channel. Additionally, the reception unit 101 performs demodulation processing and error correction processing to generate a Motion Picture Experts Group (MPEG) 2-TS (transport stream).

The stream information extraction unit 102 extracts TS header information of a TS packet and section information from the MPEG2-TS output from the reception unit 101. The TS header information includes a packet identifier (PID), which is an identifier of a TS packet. The section information includes a table called an event information table (EIT), which contains information about a program. The information is, for example, a program name, a broadcast date and time, and details of the program.

In the case of multi-view content that includes a plurality of content data that is associated with one another and is broadcast by a plurality of channels in the same time period, "component group type=000" is used as a descriptor of a component group of the EIT. Further, the section information includes a table called a program map table (PMT). The PMT contains the PID of each coded signal elemental stream (ES) of video data or audio data that is included in a program.

The stream information analysis unit 103 analyzes the TS header information and the section information extracted by the stream information extraction unit 102, and determines the TS packet of the recording object. Information about the program being the recording object is sent to the stream information analysis unit 103 by the control unit 108. If multi-view content including content data of three channels is recorded, then PMTs that correspond to the three channels are required.

Figure 2:
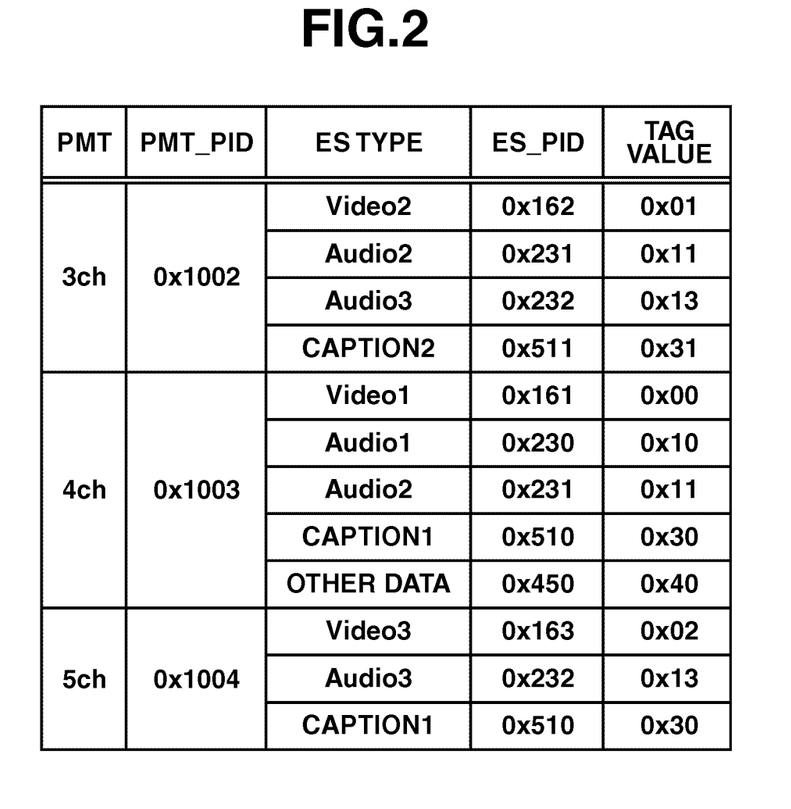
FIG. 2 illustrates an example of a program map table (PMT) of multi-view content.

FIG. 2 illustrates an example of the PMT of the multi-view content. If the multi-view content includes content data of three channels (3ch, 4ch, and 5ch), the PMT of each channel includes information about the PMT_PID, the ES type, and the ES_PID. For example, "0x1002" is assigned for the PMT_PID of the channel 3ch. The ES types of the channel 3ch are "Video 2", "Audio 2", "Audio 3", and "Caption 2". The ES_PID of the channel 3ch are "0x162", "0x231", "0x232", and "0x511". The PMT_PID that indicates the PID of each PMT is indirectly designated by a program association table (PAT).

The packet extraction/channel deletion unit 104 extracts a TS packet of a recording object that is determined by the stream information analysis unit 103 from the MPEG2-TS. At this time, the stream-for-recording generation unit 105 generates a partial TS by multiplexing the extracted TS packet.

The partial TS is a TS that has a TS packet, which does not relate to the program content being the recording object, removed from the TS packet group of the MPEG2-TS. When the partial TS is generated, the EIT is converted into a selection information table (SIT). The PMT is not converted. Further, a TS packet that includes a discontinuity information table (DIT) that indicates discontinuity information about the transport stream is added if necessary.

The storage unit 106 is a recording medium such as a hard disk. Program content data of the recording object in the form of a partial TS is stored in the storage unit 106. The management unit 109 manages the capacity of the program content data stored in the storage unit 106 as well as the available recording capacity of the storage unit 106.

If the user starts recording a certain broadcast program or reserves recording of such a program, but the available recording capacity of the storage unit 106 is not enough, then the control unit 108 executes processing to increase the available recording capacity of the storage unit 106.

Figure 3:
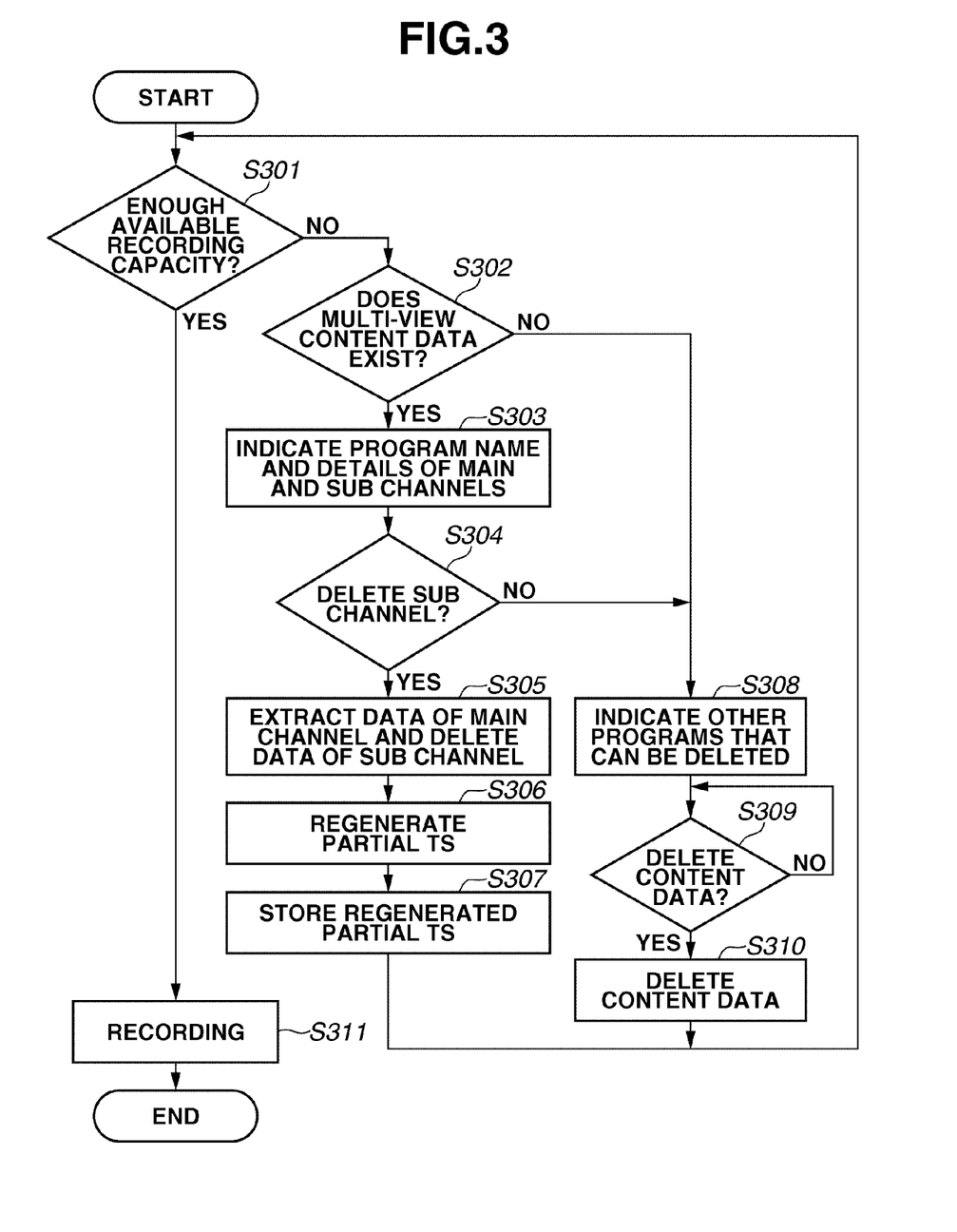
FIG. 3 is a flowchart illustrating processing for increasing an available recording capacity of a storage unit illustrated in FIG. 1.

FIG. 3 is a flowchart illustrating processing for increasing the available recording capacity of the storage unit 106. In step S301, the control unit 108 determines whether the storage unit 106 has enough available recording capacity. More particularly, the control unit 108 acquires the EIT of the broadcast program of the recording object from the stream information analysis unit 103, and calculates a capacity C_REC that is necessary to record the recording object based on, for example, time information of the broadcast program being the recording object, a record video image format, and whether the content is multi-view content.

The management unit 109 can store data of an electronic program guide (EPG) for one week that is received via the reception unit 101 before the record reservation is executed. If the EPG data is stored, the control unit 108 acquires the EIT of the broadcast program being the recording object from the management unit 109.

The control unit 108 acquires an available recording capacity C_VAC of the storage unit 106 from the management unit 109 and compares C_REC, the calculated capacity necessary in recording, with the available recording capacity C_VAC. In step S301, if C_REC is smaller than C_VAC as a result of the comparison (YES in step S301), then the process proceeds to step S311. In step S311, the control unit 108 performs control to execute the record processing. On the other hand, if C_REC is greater than C_VAC (NO in step S301), then the process proceeds to step S302.

In step S302, the control unit 108 searches for multi-view content data from the program content stored in the storage unit, and then selects one multi-view content data. More particularly, the control unit 108 sequentially reads out a partial TS of each program content data stored in the storage unit, and performs control to output the partial TS that is read out to the stream information extraction unit 102. Then, the stream information extraction unit 102 extracts the TS header information and the section information from the partial TS of each program content data that is read out.

The stream information analysis unit 103 analyzes the SIT that is included in the extracted section information, and determines whether the SIT includes program content data having the component group descriptor of "component group type=000". The control unit 108 receives the result of the analysis from the stream information analysis unit 103. If program content data with the description of "component group type=000" exists (YES in step S302), then the control unit 108 determines that multi-view content data exists and the process proceeds to step S303. On the other hand, if program content data with the description of "component group type=000" does not exist (NO in step S302), then the control unit 108 determines that multi-view content data does not exist, and the process proceeds to step S308.

In step S303, the control unit 108 indicates, for the user, the program name and details of the main channel and the sub channel of the selected multi-view content data. In step S304, the control unit 108 inquires of the user via the display screen whether to permit the deletion of the data of the sub channel while keeping the data of the main channel of the selected multi-view content. If the user permits the deletion of the data of the sub channel (YES in step S304), then the process proceeds to step S305. If the user does not permit the deletion of the data of the sub channel (NO in step S304), then the process proceeds to step S308.

In step S305, the control unit 108 performs control to start the operation for extracting the data of the main channel of the selected multi-view content data and deleting the data of the sub channel. The control unit 108 determines the ES of the main channel from the SIT of the partial TS that is analyzed by the stream information analysis unit 103.

Figure 4:
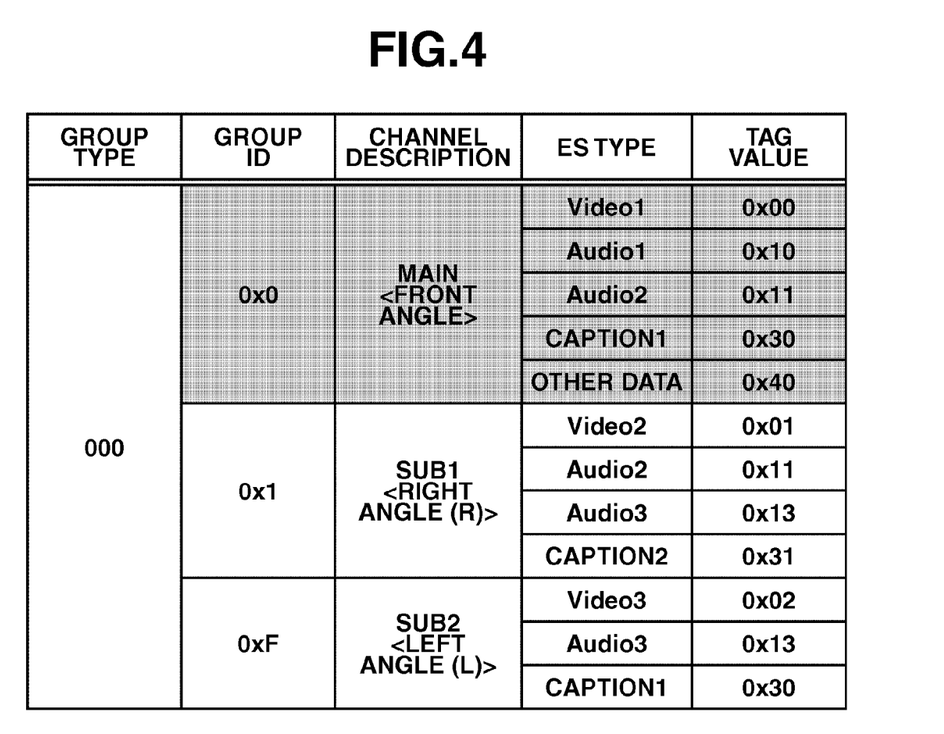
FIG. 4 illustrates an example of a selection information table (SIT) of the multi-view content.

FIG. 4 illustrates an example of the SIT of multi-view content data. As the component group descriptor of the SIT of the multi-view content, "component group type=000" is assigned. Further, "component group ID=0x0" is assigned to the main channel. Channels having different component group IDs are sub channels.

The control unit 108 acquires a tag value that is assigned to each ES that belongs to the main channel <front angle> of the "component group ID=0x0". Further, the control unit 108 acquires the PMT (see FIG. 2) that is analyzed by the stream information analysis unit 103, and compares a tag value of each ES in the PMT and a tag value in the SIT. Then, the control unit 108 determines ES_PIDs "0x161", "0x230", "0x231", "0x510", and "0x450" that correspond to tag values "0x00", "0x10", "0x11", "0x30", and "0x40", respectively. Each of the tag values is assigned to each ES of the main channel <front angle>. The determined ES_PIDs are transmitted from the stream information analysis unit 103 to the packet extraction/channel deletion unit 104.

The packet extraction/channel deletion unit 104 extracts a TS packet that includes ES_PID of a determined main channel from the partial TS of the multi-view content data. Further, the packet extraction/channel deletion unit 104 extracts a TS packet including the PAT, the PMT, and the SIT that correspond to the ES_PID of the determined main channel from the partial TS of the multi-view content. The packet extraction/channel deletion unit 104 deletes unnecessary data of the sub channel.

Next, in step S306, the stream-for-recording generation unit 105 regenerates a partial TS from the extracted TS packet. At this time, the stream-for-recording generation unit 105 changes the component group descriptor in the SIT and multiplexes the extracted TS packet again.

In step S307, the regenerated partial TS is stored in the storage unit 106 and the multi-view content data before the regeneration of the partial TS is deleted from the storage unit 106. Then, the process returns to step S301 from step S307, and the control unit 108 checks whether the available recording capacity of the storage unit 106 is larger than the capacity necessary in recording the broadcast program of the recording object and a similar operation is repeated.

If the multi-view content is determined not to exist in step S302 (NO in step S302) or the user does not permit the deletion of the sub channel of the multi-view content data in step S304 (NO in step S304), then the process proceeds to step S308. In step S308, the control unit 108 executes processing for indicating other programs that can be deleted. Such methods indicate potential programs that can be deleted by indicating, for example, content data of old broadcast date and time or indicating content data that has already been reproduced (viewed).

In step S309, if the control unit 108 receives from the user an instruction for deleting the program content data that has been indicated (YES in step S309), then the process proceeds to step S310. In step S310, the control unit 108 deletes the designated program content, and then the process returns to step S301.

As described above, according to the first exemplary embodiment, the available recording capacity of the recording apparatus can be increased by deleting content data of at least one channel of the recording for completed multi-view content. In this way, the broadcast program being a recording object can be recorded.

Although, a case where multi-view content data is automatically searched so as to automatically increase the available recording capacity when the available recording capacity of the storage unit 106 is not enough has been described above, the present invention is not limited to such a case. For example, the multi-view content data can be searched when the user performs operation for increasing the available recording capacity using a menu screen or performs operation for searching multi-view content data using a menu screen.

Figure 5:
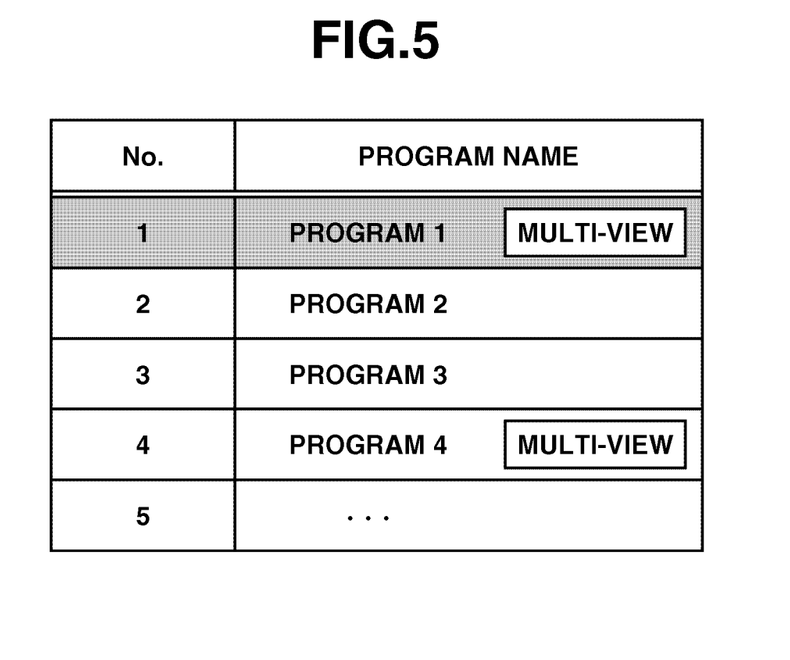
FIG. 5 illustrates a list of recording-completed program content.

Further, if the available recording capacity of the storage unit 106 is not enough, a list of already-recorded program content data can be indicated and the user can select multi-view content data from a plurality of program content data whose recording is completed by operating a remote control unit. For example, as illustrated in FIG. 5, a list of program content data whose recording is completed is indicated and an icon that indicates whether the content data is multi-view content data is displayed. Then, the user can select "program 1", which has an icon of the multi-view content, from the list of program content data whose recording is completed by operating the remote control unit.

Further, according to the above-described example, although the data of the sub channel is deleted while the data of the main channel is maintained, the recording apparatus can be configured so that the user can arbitrarily designate a channel that is deleted by operating the remote control unit. Furthermore, the recording apparatus can be configured so that not only data of a single channel but of a plurality of channels can be maintained. Additionally, the recording apparatus can be configured so that although the data of the sub channel is maintained, the video image of the sub channel is changed into that of a lower quality.

According to a second exemplary embodiment, a method for indicating, for the user, a list of a plurality of multi-view content data whose recording is completed when the available recording capacity of the storage unit 106 is not enough will be described. Since the configuration of the recording apparatus 100 according to the second exemplary embodiment is similar to that illustrated in FIG. 1, the descriptions are not repeated.

Figure 6:
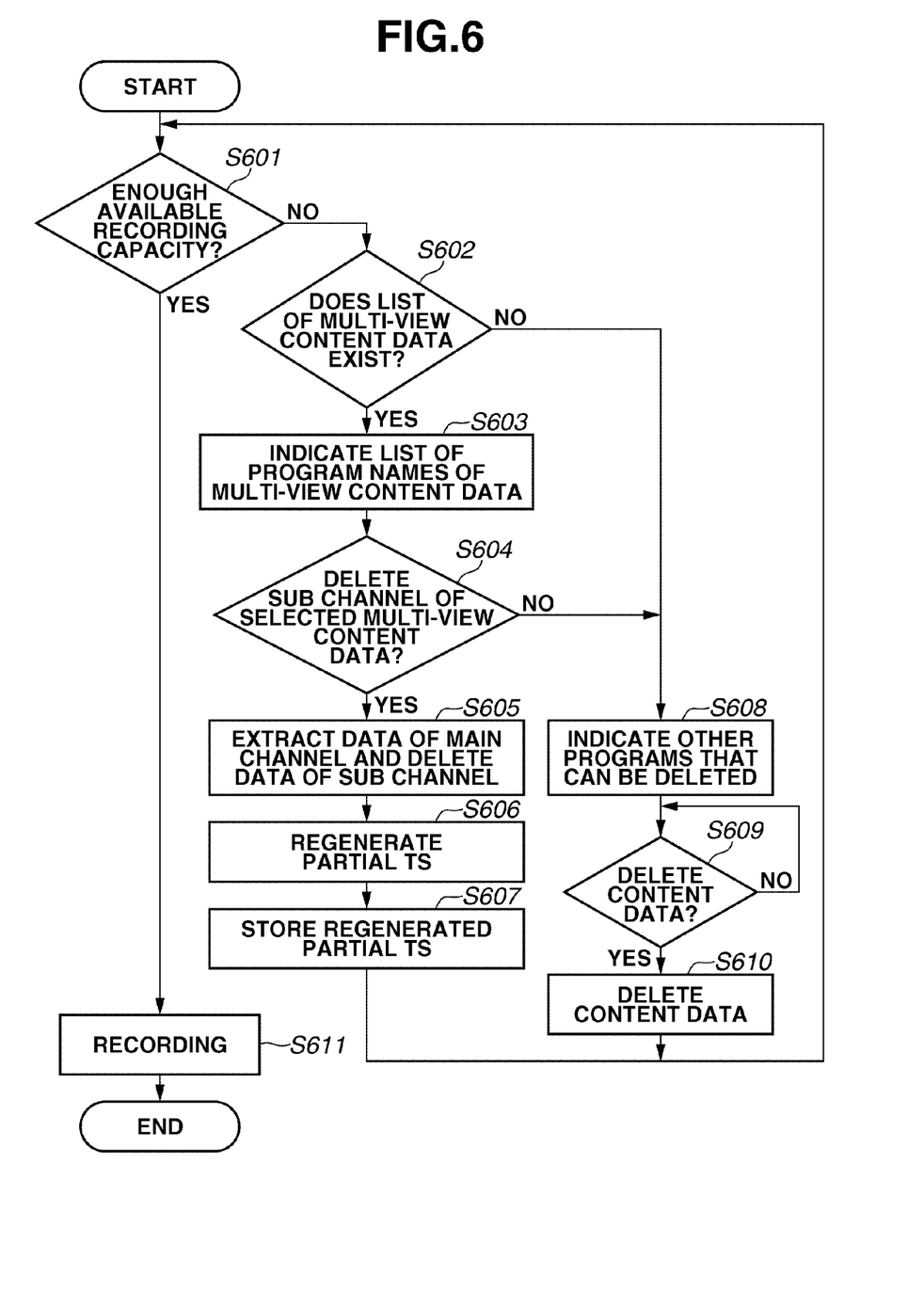
FIG. 6 is a flowchart illustrating processing for increasing the available recording capacity of the storage unit according to a second exemplary embodiment of the present invention.

FIG. 6 is a flowchart illustrating processing for increasing the available recording capacity of the storage unit according to the second exemplary embodiment of the present invention. Step S601 and steps S605 to S611 in FIG. 6 are similar to step S301 and steps S305 to S311 in FIG. 3.

According to the second exemplary embodiment, the management unit 109 stores the list of multi-view content data that are stored in the storage unit 106. If a multi-view content data is recorded, then information about the program, being a recording object, which is analyzed by the stream information analysis unit 103 is added to the list of the multi-view content data. More particularly, the control unit 108 receives a result of the analysis from the stream information analysis unit 103 and if program content data with the "component group type=000" is included, the control unit 108 determines the program with the "component group type=000" as multi-view content data, and then it is added to the list of multi-view content data.

In step S602, the control unit 108 inquires of the management unit 109 whether a list of multi-view content data whose recording is completed exists. If such a list exists (YES in step S602), then the process proceeds to step S603. In step S603, the list of the multi-view content data is indicated.

Figure 7:
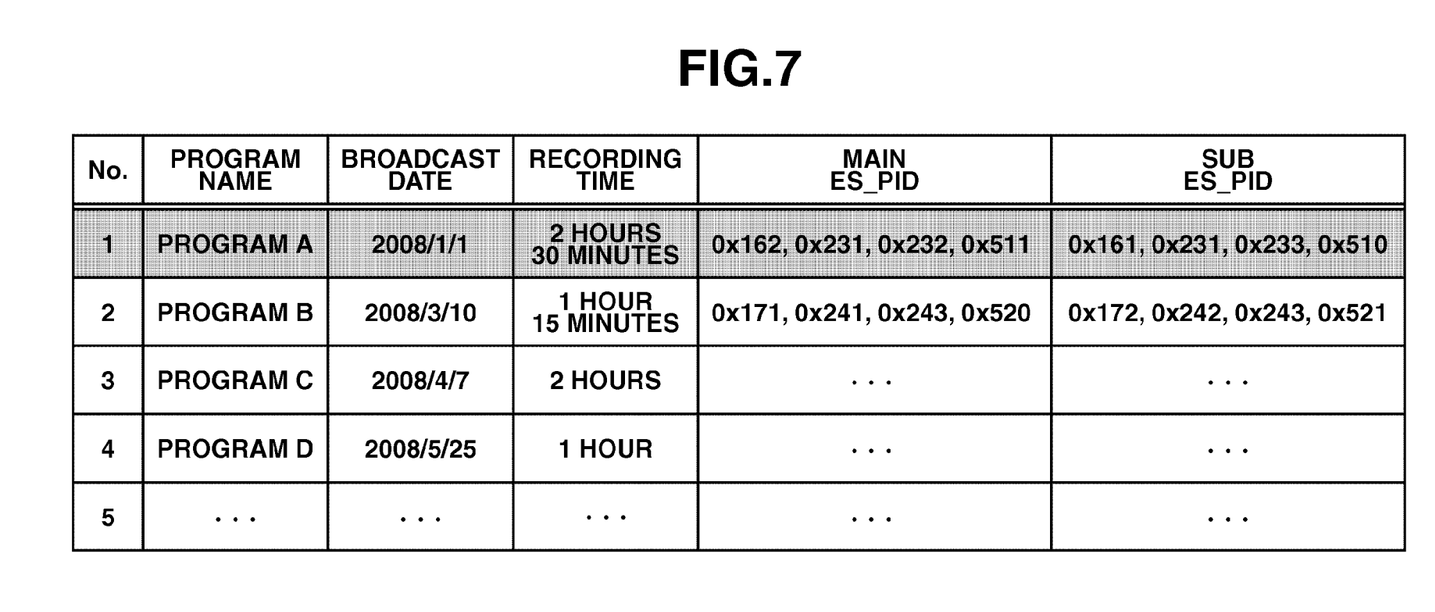
FIG. 7 illustrates an example of a list of multi-view content.

FIG. 7 illustrates an example of the list of multi-view content data. If a plurality of multi-view content data exist in the storage unit 106, the control unit 108 arranges the content data in the chronological order of broadcast date and time. In this case, the content data are arranged in the order of "program A", "program B", "program C", and "program D".

The broadcast date and time information can be acquired from the EIT that is analyzed by the stream information analysis unit 103. However, the SIT may be acquired in place of the EIT. More particularly, the control unit 108 reads out all the partial TS of each of the multi-view content data in the storage unit 106, and the stream information extraction unit 102 extracts the TS header information and the section information from each partial TS of each program content. The stream information analysis unit 103 analyzes the SIT that is included in the extracted section information and acquires the broadcast date and time by identifying the partial TS time descriptor.

In step S604, the control unit 108 inquires of the user whether to permit the deletion of the data of the sub channel while keeping the data of the main channel of the "program A" being multi-view content data that is selected as default data. According to the screen illustrated in FIG. 7, the "program A", which is multi-view content data having the oldest broadcast date and time, is selected as the default data.

By using the display screen and by operating the remote control unit, the user can designate and arbitrarily select a program whose data of the sub channel is to be deleted. For example, if the user desires to delete data of a sub channel of multi-view content data that is already reproduced regardless of the broadcast date and time, or desires to delete data of a sub channel of multi-view content data whose importance is low to the user, then the user can arbitrarily select such program content data. Further, the user can select a plurality of multi-view content data, and delete the data of the sub channels of the selected plurality of multi-view content data as a whole.

In step S605, the control unit 108 extracts the data of the main channel of the selected multi-view content data and deletes the data of the sub channel.

As described above, according to the second exemplary embodiment, if the available recording capacity of the storage unit 106 is not enough but a plurality of multi-view content data are stored in the storage unit 106, a list of the plurality of multi-view content data is indicated. By using the display screen, the user can arbitrarily select program content data whose data of the sub channel is to be deleted from the list of the plurality of multi-view content data, and thus usability is improved. Further, by arranging the program content data included in the list of the plurality of multi-view content data in the chronological order of broadcast date and time, the user can easily see which program is of low importance.

However, the order of the content data in the list is not limited to the order of broadcast date and time and, for example, an order based on reproduction date and time can also be used.

Further, the list of the multi-view content data and a list of content data other than the multi-view content data (e.g., a list of normal single-view content data) can be indicated together as content data that can be deleted. If single-view content data is deleted, all data of its content is deleted.

According to a third exemplary embodiment, an unnecessary channel for the user out of a plurality of channels that are included in the multi-view content is determined and its data is deleted. Since the configuration of the recording apparatus 100 according to the second exemplary embodiment is similar to that illustrated in FIG. 1, the descriptions are not repeated.

Figure 8:
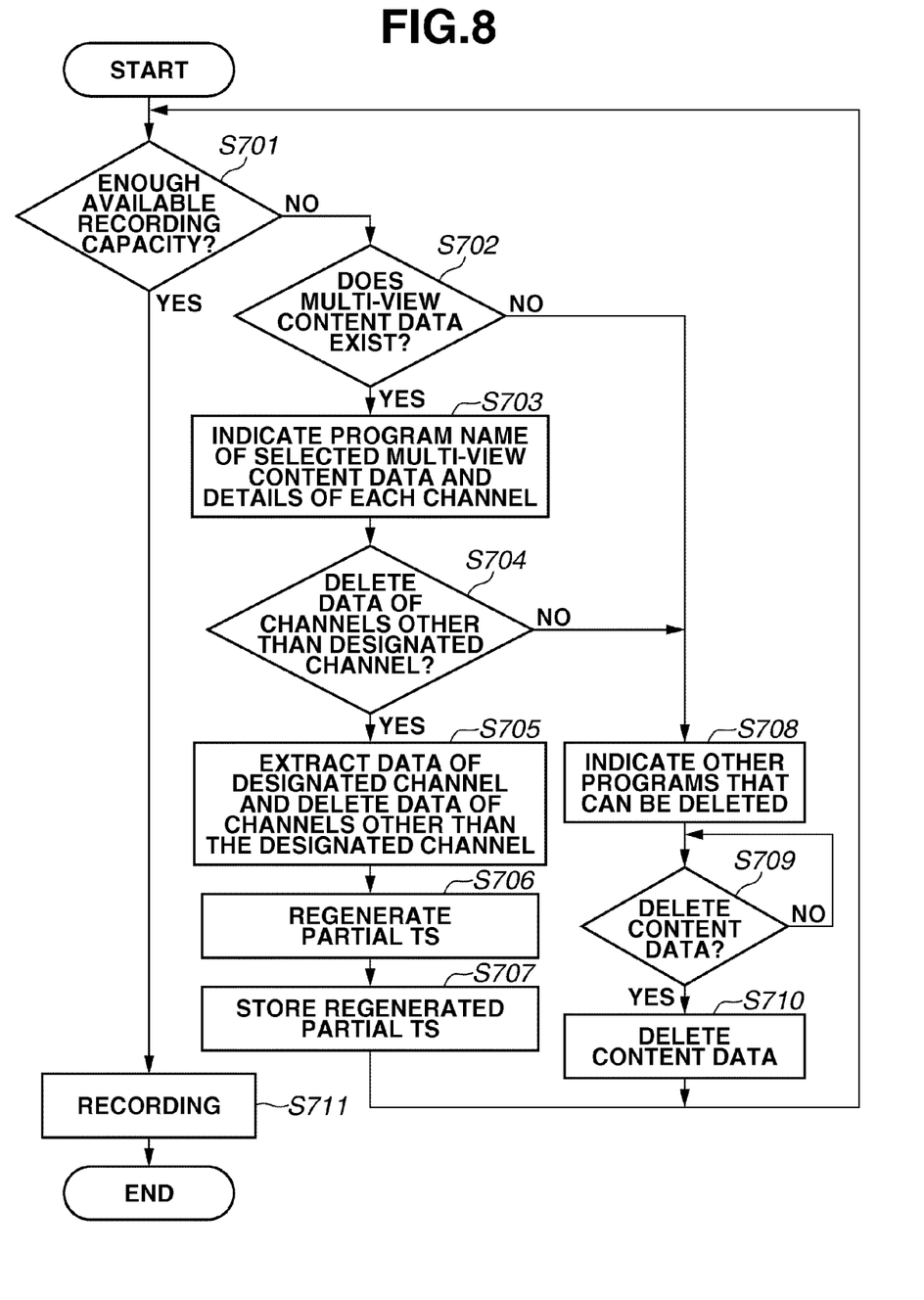
FIG. 8 is a flowchart illustrating processing for increasing the available recording capacity of the storage unit according to a third exemplary embodiment of the present invention.

FIG. 8 is a flowchart illustrating processing for increasing an available recording capacity of the storage unit according to the third exemplary embodiment of the present invention. Steps S701 and S702 and steps S706 to S711 are similar to steps S301 and S302 and steps S306 to S311 in FIG. 3.

In step S703, the control unit 108 searches multi-view content data from a plurality of program content data stored in the storage unit 106 and indicates a program name of the selected multi-view content data and the details of each channel. A keyword of the preference information of the user is registered in advance in the management unit 109, and the control unit 108 acquires information about the registration keyword from the management unit 109.

Figure 9:
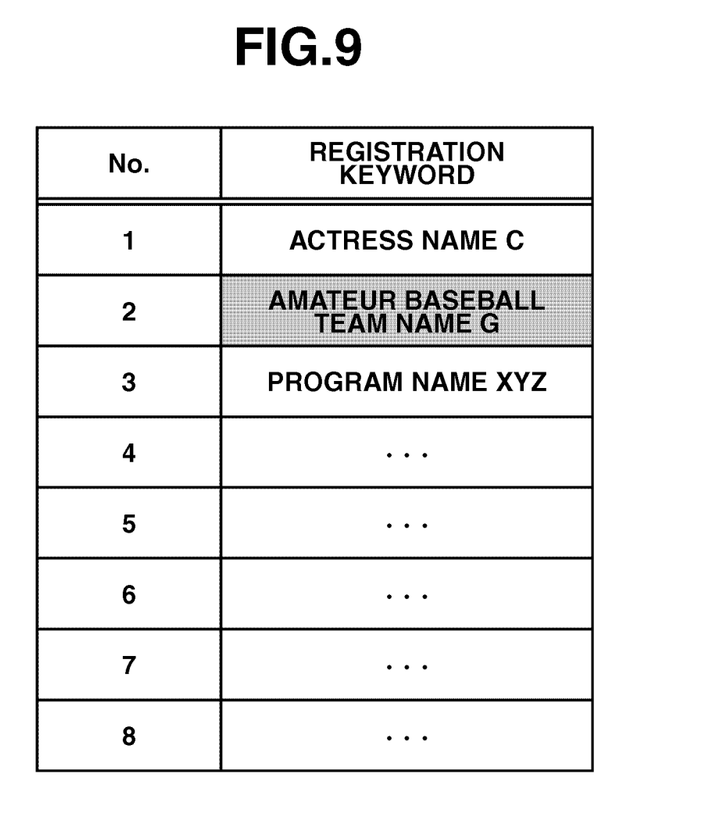
FIG. 9 illustrates examples of a registration keyword.

FIG. 9 illustrates an example of the registration keyword. The user registers, for example, the keywords "actress name C", "baseball team G", and "program name XYZ" as preference information by operating the remote control unit. The registration keywords are stored in the management unit 109 in the form of a list.

The control unit 108 compares the acquired registration keyword and the details of each channel of the multi-view content data, and then determines a channel of the highest preference. In doing so, the control unit 108 acquires description information about each channel of the multi-view content data, and determines a channel with the highest match rate regarding the channel description information and the registration keyword as the channel of the highest preference. More particularly, the control unit 108 acquires description information about each channel of the multi-view content data from the SIT of the partial TS that has been analyzed by the stream information analysis unit 103.

Figure 10:
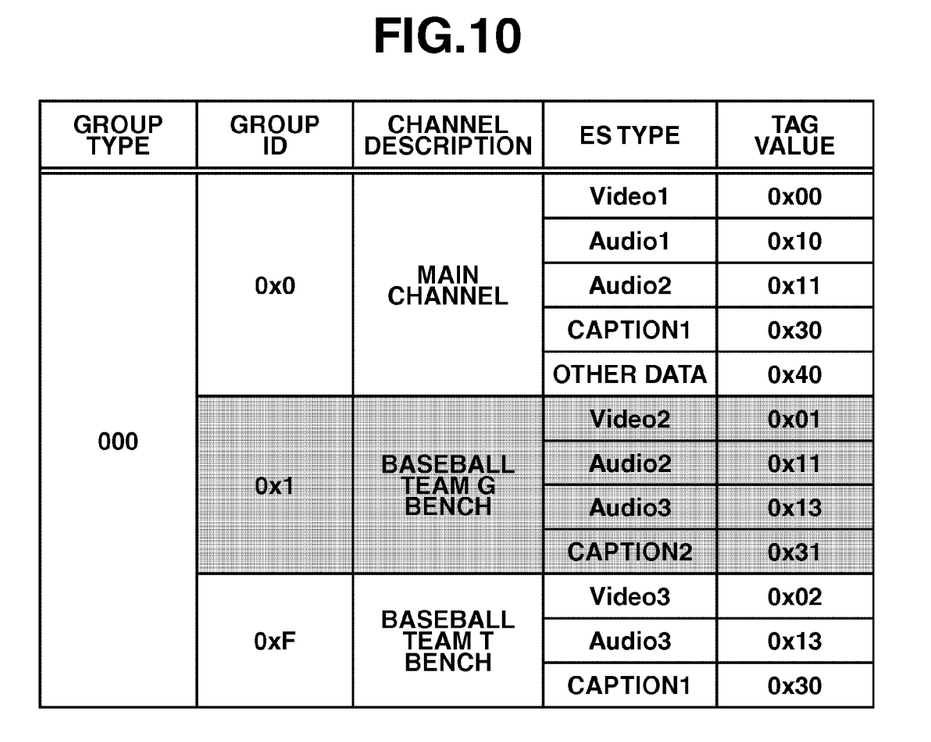
FIG. 10 illustrates an example of the SIT of the multi-view content.

FIG. 10 illustrates an example of the SIT of multi-view content data. The "component group type=000" is assigned as the component group descriptor of the SIT of the multi-view content. The channel description of the "component group ID=0x0" is "main channel". Further, the channel description of the "component group ID=0x1" is "baseball team G bench" and the channel description of the "component group ID=0xF" is "baseball team T bench".

The control unit 108 determines the channel (channel description information is "baseball team G bench") of the "component group ID=0x1" having the highest matching rate with the registration keyword "baseball team G" as the channel of the highest preference.

The control unit 108 inquires of the user whether the user maintains the data of the channel of the highest preference of the designated multi-view content data and permits deletion of the data of the other channels, via the display screen. The user can also arbitrarily designate a channel which is to be maintained and the channel which can be deleted via the display screen. Further, the user can designate not only a single channel but also of a plurality of channels in determining the data that is to be maintained.

In step S704, if the user permits the deletion of the data of the designated channel (YES in step S705), then the process proceeds to step S705. If the user does not permit the deletion of the designated channel (NO in step S705), then the process proceeds to step S708.

In step S705, the control unit 108 extracts the data of the designated channel of the selected multi-view content data and performs control to start the deletion operation of the data of the other channels. In this process, the ES of the designated channel is determined from the SIT that is analyzed by the stream information analysis unit 103. More particularly, a tag value that is assigned to each ES of the channel "baseball team G bench" of the "component group ID=0x1" is acquired.

Further, the control unit 108 acquires the PMT (see FIG. 2) that is analyzed by the stream information analysis unit 103, and compares the tag value of each ES that is in the PMT and the tag value in the SIT. Then, the control unit 108 determines ES_PIDs "0x162", "0x231", "0x232", and "0x511" that match the tag values "0x01", "0x11", "0x13", and "0x31" that are assigned to each ES of the channel "baseball team G bench". These ES_PIDs that are determined are sent to the packet extraction/channel deletion unit 104 from the stream information analysis unit 103.

The packet extraction/channel deletion unit 104 extracts the TS packet that includes the ES_PID of the channel "baseball team G bench" from the partial TS of the multi-view content. Further, the packet extraction/channel deletion unit 104 extracts the TS packet that includes the PAT, the PMT, and the SIT of the ES_PID of the channel "baseball team G bench" from the partial TS of the multi-view content data.

The packet extraction/channel deletion unit 104 deletes unnecessary data that corresponds to the channels "main channel" and "baseball team T bench". Since processes on and after step S706 are similar to those that are described referring to FIG. 3 according to the first exemplary embodiment, their descriptions are not repeated.

As described above, according to the third exemplary embodiment, a channel unnecessary to the user (i.e., channel of low preference) out of a plurality of channels included in the multi-view content is determined, and its data can be deleted.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-295798 filed Nov. 19, 2008, which is hereby incorporated by reference herein in its entirety.

What is claimed is:

1. A recording apparatus comprising:
a storage unit configured to record and store program content data transmitted in a broadcast signal;
a management unit configured to manage an available recording capacity of the storage unit;
a selection unit configured to, in a case where the available recording capacity is less than a predetermined amount, (1) select a multi-view program content data broadcasted by a plurality of channels including content data associated with each other from among the program content data in the storage unit if there is the multi-view program content data in the storage unit, and (2) select a non multi-view program content data if there is no multi-view program content data in the storage unit, wherein the multi-view program content data comprises content data of at least a main channel and a sub channel;
a display control unit configured to, (1) if the multi-view program content data is selected by the selection unit, display information of the main channel and the sub channel of the selected multi-view program content data and inquire a user whether to permit the deletion of the content data of the sub channel while keeping the content data of the main channel of the selected multi-view content, and (2) if the non multi-view program content data is selected by the selection unit, display information of the non multi-view program content data and inquire a user whether to permit the deletion of the selected non multi-view program content data; and
a deletion unit configured to, (1) if the user permits the deletion of the content data of the sub channel while keeping the content data of the main channel of the selected multi-view content, delete content data of the sub channel included in the selected multi-view program content data from the storage unit, and (2) if the user permits the deletion of non multi-view program content data, delete the selected non multi-view program content data from the storage unit.

2. The recording apparatus according to claim 1, further comprising a display control unit configured to indicate the multi-view program content data of the program content data stored in the storage unit such that the multi-view program content data is identifiable compared to the non multi-view program content data,
wherein the deletion unit selects the multi-view program content data in response to receiving a selection instruction from the user.

3. The recording apparatus according to claim 1, wherein the deletion unit deletes content data of a channel designated by a user from the storage unit.

4. The recording apparatus according to claim 1, wherein the deletion unit deletes content data of a channel having a low user preference from the storage unit.

5. The recording apparatus according to claim 1, wherein, when a plurality of multi-view program content data are stored in the storage unit, the deletion unit selects one of the plurality of multi-view program content data having oldest broadcast date and time out of the plurality of multi-view program content data and deletes content data of at least one but not all of the plurality of channels included in the selected multi-view program content data from the storage unit.

6. The recording apparatus according to claim 1, wherein, when a plurality of multi-view program content data are stored in the storage unit, the deletion unit selects one of the plurality of multi-view program content data that is designated by a user and deletes content data sub channel included in the selected multi-view program content data from the storage unit.

7. The recording apparatus according to claim 1, further comprising a stream generation unit configured to generate a partial transport stream from the content data of the main channel included in the selected multi-view program content data.

8. A method for controlling a recording apparatus, the method comprising:
recording program content data transmitted in a broadcast signal;
storing the program content data in a storage unit;
managing an available recording capacity of the storage unit;
selecting, in a case where the available recording capacity is less than a predetermined amount, (1) a multi-view program content data broadcasted by a plurality of channels including content data associated with each other from among the program content data in the storage unit if there is the multi-view program content data in the storage unit, and (2) a non multi-view program content data if there is no multi-view program content data in the storage unit, wherein the multi-view program content data comprises content data of at least a main channel and a sub channel;
displaying information of the main channel and the sub channel of the selected multi-view program content data and inquiring a user whether to permit the deletion of the content data of the sub channel while keeping the content data of the main channel of the selected multi-view content in a case where the multi-view program content data is selected by the selection unit, and displaying information of the non multi-view program content data and inquiring a user whether to permit the deletion of the selected non multi-view program content data in a case where the non multi-view program content data is selected by the selection unit; and deleting, in a case where the user permits the deletion of the content data of the sub channel while keeping the content data of the main channel of the selected multi-view content, content data of the sub channel included in the selected multi-view program content data from the storage unit, and deleting, in a case where the user permits the deletion of non multi-view program content data, the selected non multi-view program content data from the storage unit.

9. The method according to claim 8, further comprising indicating, by a display control unit, the multi-view program content data of the program content data stored in the storage unit such that the multi-view program content data is identifiable compared to the non multi-view program content data, wherein the deleting step selects the multi-view program content data in response to receiving a selection instruction from the user.

10. The method according to claim 8, wherein the deleting step deletes content data of a channel designated by a user from the storage unit.

11. The method according to claim 8, wherein the deleting step deletes content data of a channel having a low user preference from the storage unit.

12. The method according to claim 8, wherein, when a plurality of multi-view program content data are stored in the storage unit, the deleting step selects one of the plurality of multi-view program content data having oldest broadcast date and time out of the plurality of multi-view program content data and deletes content data of at least one but not all of the plurality of channels included in the selected multi-view program content data from the storage unit.

13. The method according to claim 8, wherein, when a plurality of multi-view program content data are stored in the storage unit, the deleting step selects one of the plurality of multi-view program content data that is designated by a user and deletes content data the sub channel included in the selected multi-view program content data from the storage unit.

14. The method according to claim 8, further comprising generating a partial transport stream from the content data of the main channel included in the selected multi-view program content data.

* * * * *